US009595895B2

(12) United States Patent
Glenn et al.

(10) Patent No.: US 9,595,895 B2
(45) Date of Patent: Mar. 14, 2017

(54) MOTOR CONTROL SYSTEM AND METHOD FOR PROTECTING INRUSH RESISTOR (71) Applicant: Nidec Motor Corporation, St. Louis, MO (US)

(72) Inventors: Douglas D. Glenn, Litchfield, IL (US); Donald R. Mertens, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 48 days.

(21) Appl. No.: 14/472,235

(22) Filed: Aug. 28, 2014

(65) Prior Publication Data
US 2016/0065103 A1  Mar. 3, 2016

(51) Int. Cl.
*H02H 7/08* (2006.01)
*H02P 1/16* (2006.01)
*H02H 9/00* (2006.01)
*H02P 27/04* (2016.01)

(52) U.S. Cl.
CPC .............. *H02P 1/16* (2013.01); *H02H 9/002* (2013.01); *H02P 27/04* (2013.01)

(58) Field of Classification Search
CPC ... H02P 6/20; H02P 1/26; H02P 6/002; H02H 9/001; H02H 1/0015; H02H 1/043; H02H 3/16; H02H 3/17; H02H 3/33; H02H 3/027; H02H 3/331; H02H 7/18; H02M 1/4225; G01R 31/025; B60L 3/0069; B60L 3/04; Y10S 323/908; Y10S 388/903; F02D 2041/2048

USPC ............. 318/400.21, 375, 434, 268, 400.22; 361/42, 45
See application file for complete search history.

(56) References Cited

U.S. PATENT DOCUMENTS

| | | | | |
|---|---|---|---|---|
| 3,953,766 A | * | 4/1976 | Howell | H02H 3/027 361/45 |
| 5,691,869 A | * | 11/1997 | Engel | H02H 1/0015 361/42 |
| 5,963,405 A | * | 10/1999 | Engel | H02H 1/0015 361/42 |
| 6,400,539 B1 | * | 6/2002 | Sekiguchi | H02H 9/001 323/908 |
| 6,426,885 B1 | * | 7/2002 | Sekiguchi | H02H 9/001 318/434 |
| 7,068,010 B2 | * | 6/2006 | Youm | H02M 7/5387 318/434 |

(Continued)

Primary Examiner — Paul Ip
(74) Attorney, Agent, or Firm — Hovey Williams LLP (57) ABSTRACT A system for protecting an inrush resistor by determining whether an inrush relay connected in parallel with the resistor properly closes. A differential amplifier connected across the resistor produces an output signal that is proportional to the differential voltage. A control circuit determines whether the relay is open based on the output signal, and if the relay is open and the motor is running, takes remedial action to protect the inrush resistor. Alternatively, the amplifier is replaced with a slow response filter that produces an output signal that is a delayed version of a bus voltage. The control circuit determines the difference between the bus voltage and the output signal, and if it exceeds a predetermined value and the motor is running, takes remedial action to protect the inrush resistor. Remedial action may include shutting off the motor or restarting the motor to confirm improper behavior of the relay.

16 Claims, 5 Drawing Sheets (56) References Cited

U.S. PATENT DOCUMENTS

| | | | | |
|---|---|---|---|---|
| 7,170,245 | B2* | 1/2007 | Youm | H02P 3/22 |
| | | | | 318/268 |
| 7,948,721 | B2* | 5/2011 | Brunner | H02P 29/022 |
| | | | | 318/503 |
| 8,373,420 | B2* | 2/2013 | Lupaczyk | G01R 31/025 |
| | | | | 324/509 |
| 8,502,409 | B2* | 8/2013 | Kato | B60L 3/0069 |
| | | | | 307/10.6 |
| 2002/0051371 | A1* | 5/2002 | Sekiguchi | H02H 9/001 |
| | | | | 363/40 |
| 2004/0090807 | A1* | 5/2004 | Youm | H02M 7/5387 |
| | | | | 363/132 |
| 2004/0227479 | A1* | 11/2004 | Youm | H02P 3/22 |
| | | | | 318/375 |
| 2006/0022648 | A1* | 2/2006 | Ben-Yaakov | H02M 1/4225 |
| | | | | 323/222 |
| 2009/0167229 | A1* | 7/2009 | Brunner | H02P 29/022 |
| | | | | 318/503 |
| 2011/0025341 | A1* | 2/2011 | Lupaczyk | G01R 31/025 |
| | | | | 324/509 |
| 2011/0128662 | A1* | 6/2011 | Kato | B60L 3/0069 |
| | | | | 361/166 |
| 2012/0043967 | A1* | 2/2012 | Miura | B60L 3/0069 |
| | | | | 324/426 |
| 2014/0049860 | A1* | 2/2014 | Arima | G01R 31/025 |
| | | | | 361/42 |

* cited by examiner

MOTOR CONTROL SYSTEM AND METHOD FOR PROTECTING INRUSH RESISTOR

FIELD

The present invention relates to systems and methods for controlling the operation of electric motors.

BACKGROUND

When power is first applied to electric motor systems they experience a large spike in (or a "rushing in" of) electric current of, e.g., 150 Amperes or more caused by the initial charging of their bus capacitors. Unabated, this inrush of current can damage the system's electrical components. Some systems use an inrush resistor electrically connected in series with the power source to ameliorate the effects of the inrush of current. Once the bus capacitor is charged and the inrush of current ends, the inrush resistor is removed from the circuit by an inrush relay that closes to create a short circuit around the inrush resistor. However, if the inrush relay fails to close, such that the inrush resistor remains in the circuit, then the inrush resistor can experience increasing levels of power and heat as the load increases and the motor draws more current through the inrush resistor. At higher power levels the inrush resistor may burn out, but even at lower power levels the inrush resistor may generate substantial heat.

This background discussion is intended to provide information related to the present invention which is not necessarily prior art.

SUMMARY

Embodiments of the present invention solve the above-described and other problems and limitations by providing improved inrush current protection by detecting whether an inrush relay properly closes shortly after power is applied to the system (and remains closed during subsequent operation), and if not, responds by restarting the motor to confirm a problem with the inrush relay and then shutting off the motor to avoid damage to an inrush resistor. In one implementation, one or more subsequent attempts may be made to restart the motor to determine whether the problem persists.

An electric motor system constructed in accordance with the present invention may broadly comprises an electric motor and a motor control subsystem operable to control the operation of the motor. In a first embodiment, the motor control subsystem may include a power inverter operable to receive power from a power source and to convert the power to drive the motor; an inrush resistor electrically connected in series with the power source and operable to ameliorate an initial increase in an electric current during charging of a bus capacitor prior to starting the motor; an inrush relay electrically connected in parallel with the inrush resistor and operable to close after the bus capacitor is charged and thereby direct the electric current around rather than through the inrush resistor; a differential amplifier electrically connected across the inrush resistor and operable to sense a differential voltage across the inrush resistor and to produce an output voltage signal that is proportional to the differential voltage; and a control block. The control block may be in communication with the differential amplifier and operable to determine whether the inrush relay is open based on the output voltage signal, and if the inrush relay is open and the motor is running, to take remedial action to protect the inrush resistor.

In various implementations of the first embodiment, the electric motor system may further include any one or more of the following additional features. The motor may be an electric induction or permanent magnet motor. The remedial action may include sending a control signal to shut off the motor. The remedial action may include sending a first control signal to open the inrush relay and restart the motor, determining whether the inrush relay is operating properly during the restarting of the motor, and if the inrush relay is not operating properly, sending a second control signal to the power inverter to shut off the motor.

In a second embodiment, the electric motor subsystem may include the power inverter; the inrush resistor; the inrush relay; a slow response filter connected to a bus voltage and operable to produce an output voltage signal that is a delayed version of the bus voltage, and the control block. The control block may be in communication with the slow response filter and operable to determine a voltage difference between the bus voltage and the output voltage signal, wherein the voltage difference is representative of a change in the bus voltage, and if the voltage difference exceeds a predetermined threshold value and the motor is running, to take remedial action to protect the inrush resistor.

In various implementations of the second embodiment, the electric motor system may further include any one or more of the following additional features. The motor may be an electric induction or permanent magnet motor. The remedial action may include sending a control signal to shut off the motor. The remedial action may include sending a first control signal to open the inrush relay and restart the motor, determining whether the inrush relay is operating properly during the restarting of the motor, and if the inrush relay is not operating properly, sending a second control signal to the power inverter to shut off the motor. The remedial action may include incrementing an error counter; if the error counter exceeds a predetermined threshold number of errors, sending a control signal to open the inrush relay and starting the motor; determining whether the inrush relay is closing properly after the electric motor is restarted; and if the inrush relay is not closing properly, sending a second control signal to shut off the motor. The controller block may be further operable to monitor the bus voltage during and after starting of the motor; determine when the bus voltage stabilizes; record the stabilized bus voltage; compare the recorded stabilized bus voltage to the actual bus voltage; and increment the error counter if a difference between the recorded stabilized bus voltage and the actual bus voltage exceeds a second predetermined threshold value.

Additionally, each of these implementations and embodiments may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides improved inrush current protection by detecting whether an inrush relay properly closes shortly after power is applied to the system (and remains closed during subsequent operation), and if not, responds by restarting the motor to confirm a problem with the inrush relay and then shutting off the motor to avoid damage to an inrush resistor. In one implementation, one or more subsequent attempts may be made to restart the motor to determine whether the problem persists.

Figure 1:
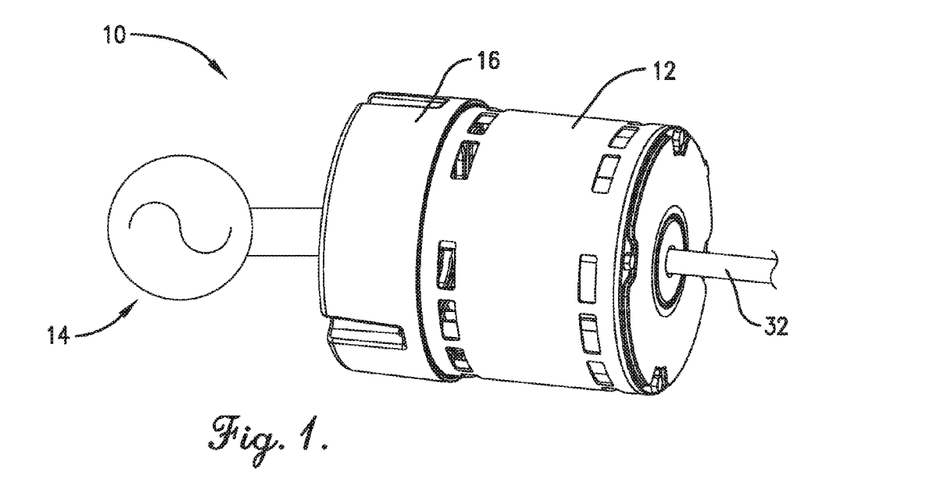
FIG. 1 is a schematic diagram of an electric motor system of the present invention.
Figure 2:
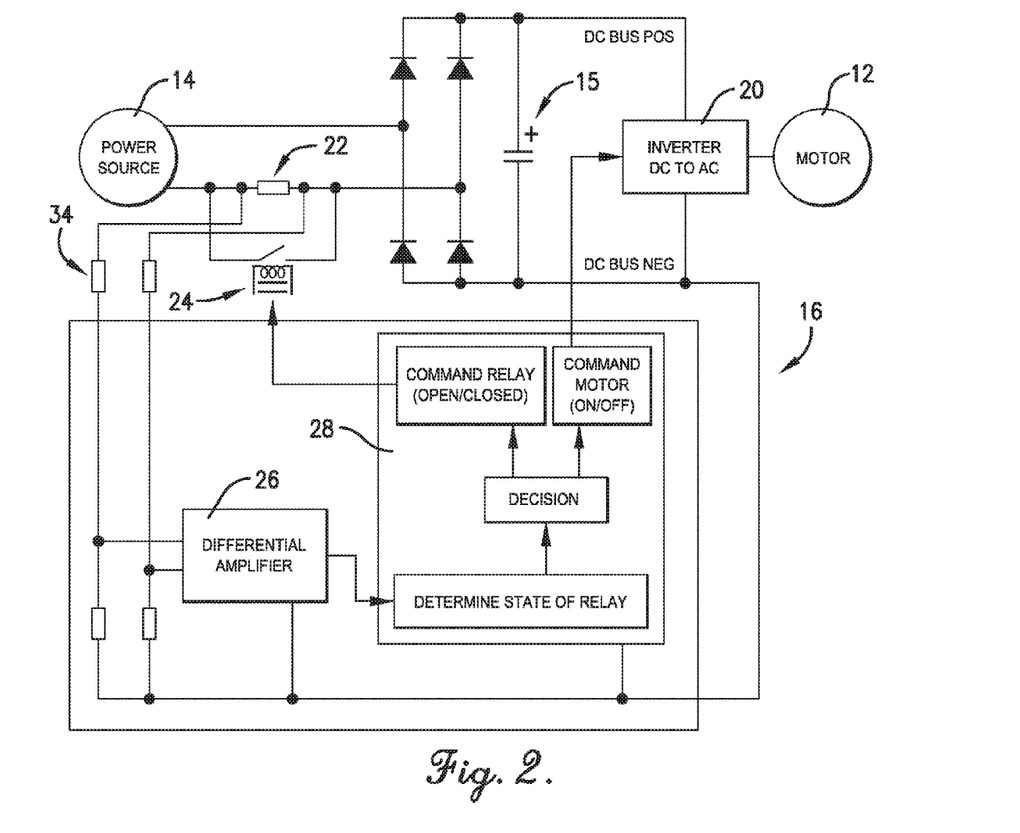
FIG. 2 is a block diagram of a first embodiment of a motor control subsystem of the electric motor system of FIG. 1.

Referring to the figures, an electric motor system 10 constructed in accordance with the present invention is shown. Referring to FIG. 1, in a first embodiment the motor system 10 may broadly include an electric motor 12; a power source 14; a bus capacitor 15; and a motor control subsystem 16. Referring to FIG. 2, in a first embodiment the motor control subsystem 16 may include a power inverter 20; an inrush resistor 22; an inrush relay 24; a differential amplifier 26; and a control circuit 28 (also referred to herein as a "control block"). The motor 12 may be an electric induction or permanent magnet motor. For example, the motor 12 may be a three-phase, fourteen-pole alternating current (AC) induction or permanent magnet motor rated to operate at a maximum voltage of approximately between 190 Volts and 200 Volts and a maximum current of approximately between 4 Amps and 6 Amps. The motor 12 may drive any appropriate load. For example, the motor 12 may drive a fan or a pump which may be part of a heating and air-conditioning unit, such as a commercial blower, or an appliance, such as a washing machine or a clothes dryer, which may include additional electrical or mechanical components not described herein. The motor 12 may include a shaft 32 which transmits the driving force to the load. The power source 14 may be a conventional AC power source, such as a standard 115 Volt, 230 Volt, or 460 Volt source available in residential and commercial buildings via standard electrical outlets. The bus capacitor 15 may be electrically connected in parallel with the motor 12, and may be charged when electric current is first applied to the system 10.

The motor control subsystem 16 may be broadly operable to control operation of the motor 12, including receiving power from the power source 14 and generating a driving waveform to power the motor 12. The power inverter 20 may be operable to convert DC power to AC power at a required frequency and amplitude to power the motor 12. To that end, the power inverter 20 may include three half-bridge inverters, with each inverter including two transistors that are alternately turned on and off to produce three voltage signals, each 120 degrees apart in phase, to power the three-phase motor 12.

The inrush resistor 22 may be electrically connected in series with the power source 14 and may be operable to ameliorate the effects of the inrush of current accompanying the motor control subsystem's initial connection to the power source 14 during charging of the bus capacitor 15.

Figure 3:
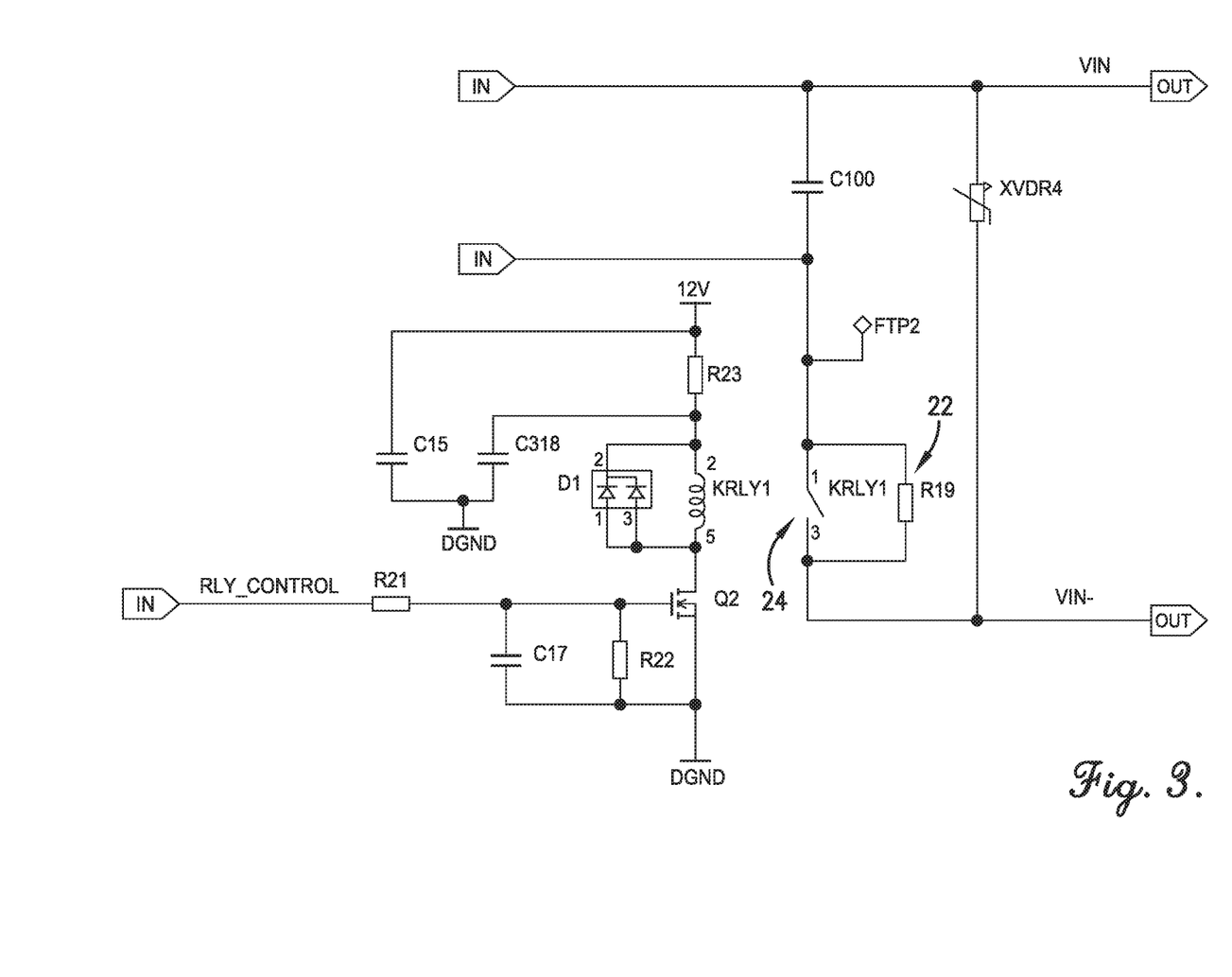
FIG. 3 is a schematic diagram of an implementation of an inrush protection circuit of the motor control subsystem of FIG. 2.

The inrush relay 24 may be electrically connected in parallel with the inrush resistor 22 and operable to open when the motor control subsystem 16 is initially connected to the power source 14, such that current flows through the inrush resistor 22, and to close once the bus capacitor 15 is charged and the inrush of current ends, such that the inrush resistor 22 is removed from the circuit and current does not flow through it. Referring to FIG. 3, one possible, non-limiting implementation of the inrush resistor/relay circuit of FIG. 2 is shown in greater detail. Other implementations are possible, and the details of any such implementations of the motor system 10 of the present invention will largely depend on the requirements and functionalities of the system 10 and its various components.

The differential amplifier 26 may be electrically connected across the inrush resistor 22 and may be operable to sense the differential voltage across the inrush resistor 22. If the inrush relay 24 is open, then this voltage should be much greater than zero, and if the inrush relay 24 is closed, then this voltage should be approximately zero. Thus, the differential amplifier 26 produces an output voltage signal that is proportional to the differential voltage across the inrush resistor 22, and the information contained in this output voltage signal allows for determining whether the inrush relay 24 is open or closed, and is provided to the control block 28. In one implementation, a plurality of resistors 34 reduce the common mode voltages into the common mode input range of the differential amplifier 26.

The control block 28 may receive the output voltage signal from the differential amplifier 26 and may be operable to control operation of the inrush relay 24 and the power inverter 20. More specifically, if the output of the differential amplifier 26 indicates that the inrush relay 24 is open and the control block 28 senses that the motor 12 is on, then the control block 28 may send a first control signal to open the inrush relay 24 and restart the motor 12 in order to determine whether the inrush relay is, in fact, operating improperly, and if so, may send a second control signal to cause the motor 12 to shut off in order to protect the inrush resistor 22.

In one implementation, the control block 28 may be constructed entirely of hardware, and the differential amplifier 26 may be directly connected to and operable to send a signal to shut off the power inverter 20. In another implementation, the control block 28 may include a microprocessor operable to execute software. Such a microprocessor may be operable to receive and process signals from various components of the system 10, including the differential amplifier 26; generate signals used to control operation of the system 10, including signals that control operation of the inrush relay 24 and the power inverter 20; and execute one or more computer programs, including control software, comprising executable instructions for accomplishing certain signal processing and generation and other functionality. In particular, the microprocessor may execute a computer program that receives the output voltage signal from the differential amplifier 26 and, based thereon, determines whether the inrush relay 24 is operating properly, and if not, sends the first and second control signals. In one implementation, the control block 28 circuitry is referenced to a negative line of the DC bus.

In operation, the system 10 may function as follows. During normal operation, while the inrush event is occurring the inrush relay 24 is open and current flows through the inrush resistor 22. Once the bus capacitor 15 is charged, the inrush relay 24 closes, which removes the inrush resistor 22 from the circuit, and the current flows through the inrush relay 24 rather than through the inrush resistor 22. During abnormal operation, the inrush relay 24 remains open and the inrush resistor 22 remains in the circuit and current continues to flow through it.

Figure 4:
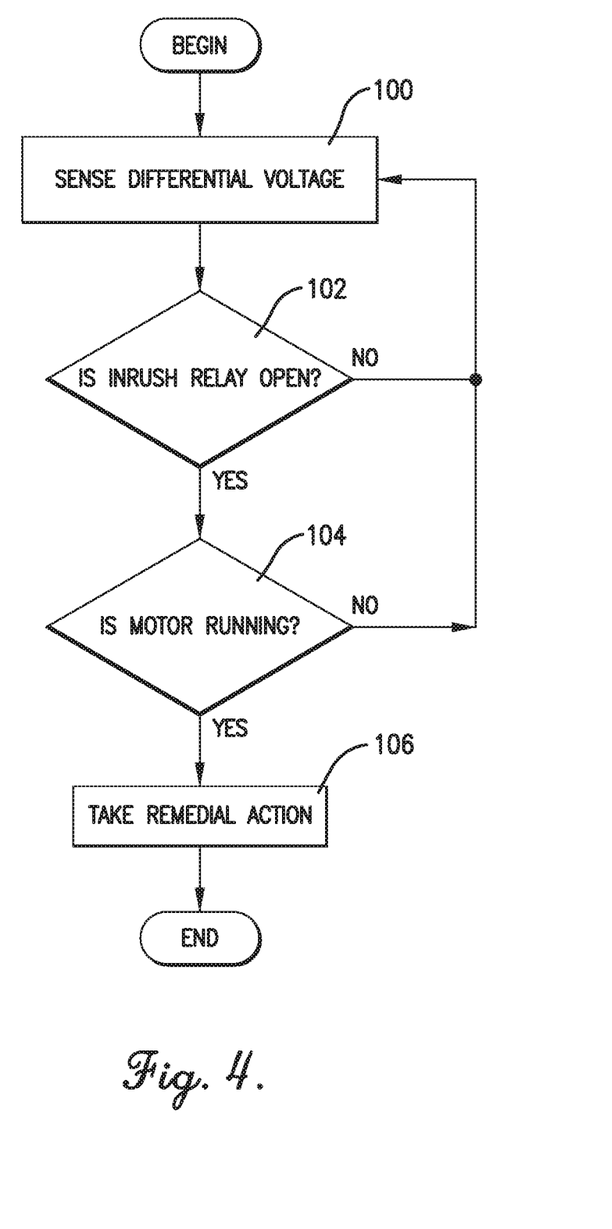
FIG. 4 is a flow diagram of steps involved in the operation of the motor control subsystem of FIG. 2.

Referring to FIG. 4, in the first embodiment the differential amplifier 26 senses the differential voltage across the inrush resistor 22 and generates the output voltage signal, as shown in step 100. The control block 28 receives the output voltage signal of the differential amplifier 26 and based on the reported differential voltage, determines whether the inrush relay 24 is open or closed, as shown in step 102. More specifically, if the inrush relay 24 is open, then the differential voltage should be much greater than zero, and if it is closed, then the differential voltage should be approximately zero. The control block 28 also determines whether the motor 12 is running, as shown in step 104. If the inrush relay 24 is closed and the motor 12 is on, then the system 10 continues normal operation, including continuing to monitor the differential voltage, as shown in step 100. However, if the inrush relay 24 is open, such that current is flowing through the inrush resistor 22, and the motor 12 is on, then the control block 28 may take remedial action, as shown in step 106. In a first implementation, the remedial action may include the control block 28 sending a control signal to cause the motor 12 to shut off. In a second implementation, the remedial action may include the control block 28 sending a first control signal to reset the inrush relay 24 and restart the motor 12 in order to determine whether the inrush relay 24 is, in fact, operating improperly, and if so, sending a second control signal to cause the motor 12 to shut off.

Figure 5:
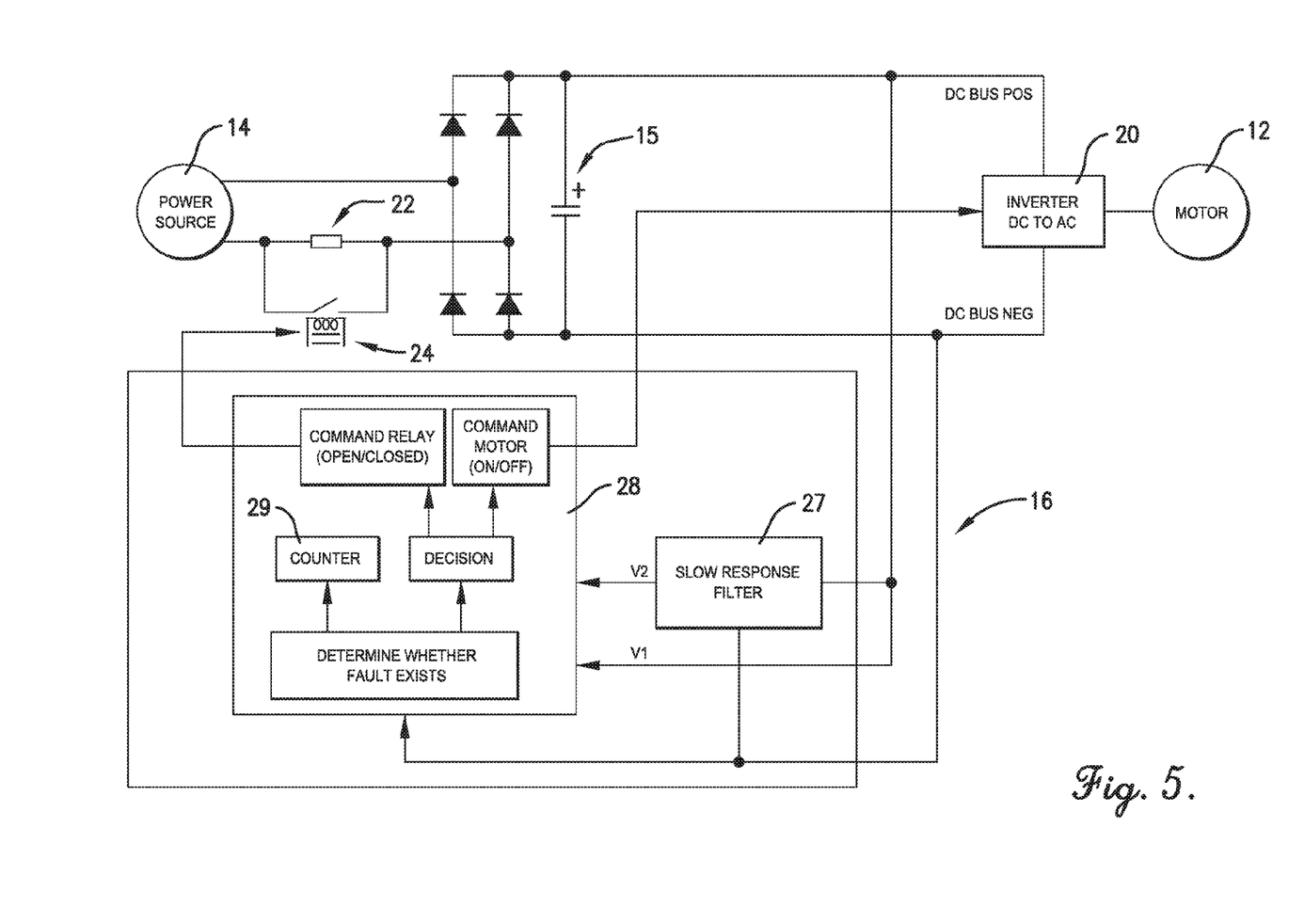
FIG. 5 is a block diagram of a second embodiment of a motor control subsystem of the electric motor system of FIG. 1.

Referring to FIG. 5, in a second embodiment the motor control subsystem 16 may include the power inverter 20; the inrush resistor 22; the inrush relay 24; a slow response filter 27; and the control block 28. The slow response filter 27 is operable to receive a first voltage signal V1 and output a second voltage signal V2 which is a delayed version of the first voltage signal V1, wherein changes in the first voltage signal V1 are slower to appear in the second voltage signal V2 due to the delaying action of the slow response filter 27. The slow response filter 27 may be connected between the DC bus and the control block 28, such that the DC bus voltage is the first voltage signal that is input to the slow response filter 27 and the first and second voltage signals V1,V2 are provided to the control block 28 for comparison. The slow response filter 27 may be implemented in hardware or software.

In operation, the system 10 may further function as follows. If the inrush relay 24 fails to close and remove the inrush resistor 22 from the circuit, or if the inrush relay 24 improperly reopens after closing and thereby reintroduces the inrush resistor 22 into the circuit, the DC bus behaves differently than if the inrush relay 24 works properly. More specifically, the DC bus voltage decreases or "sags" when power is first applied during the starting of the motor 12, and then sharply increases shortly thereafter once the bus capacitor is charged. This sharp increase is distinctive and should not occur during normal operation. If the inrush relay 24 initially properly closes but then reopens while the motor 12 is running, then the DC bus voltage sharply declines in proportion to the load on the motor 12 (i.e., the higher the load, the sharper the decline in the bus voltage). The present invention can detect both conditions, but problems other than the mid-operation failure of the inrush relay 24 can cause similar behavior of the DC bus voltage while the motor 12 is running.

Figure 6:
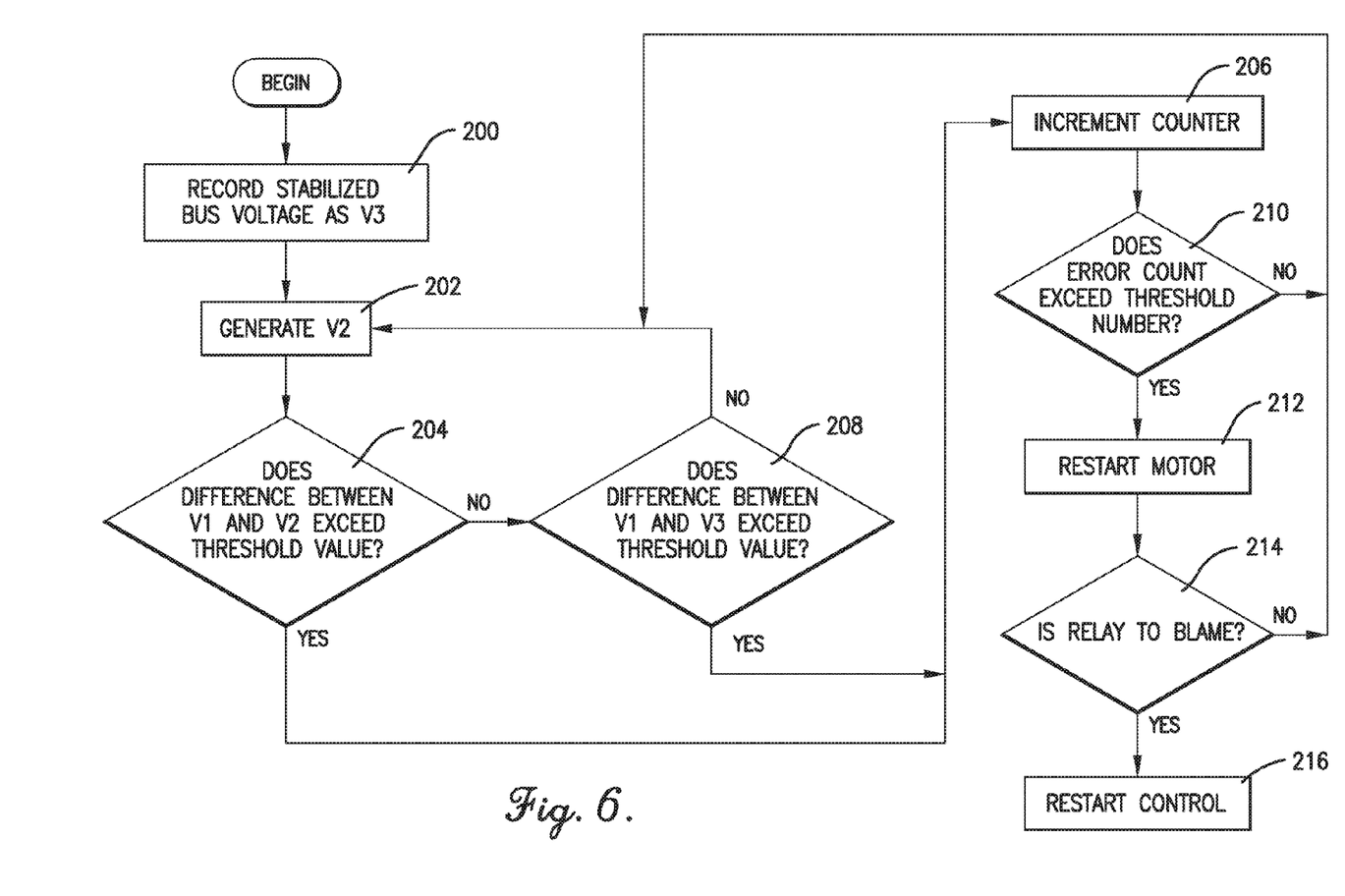
FIG. 6 is a flow diagram of steps involved in the operation of the motor control subsystem of FIG. 5.

Referring to FIG. 6, in the second embodiment the control block 28 receives the first voltage signal V1 (which may be the DC bus positive voltage), waits for it to stabilize, and records the stabilized first voltage signal V3, as shown in step 200. The slow response filter 27 receives the first voltage signal V1 and outputs a second voltage signal V2 which is a delayed version of the first voltage signal V1, as shown in step 202. The control block 28 receives and compares the first and second voltage signals V1,V2, as shown in step 204. In one implementation, the control block 28 monitors the DC bus voltage signal and changes to it during and after starting of the motor 12. During normal operation, the DC bus voltage signal may decrease by a fixed amount which is proportional to the load on the motor 12; however, if the inrush relay 24 fails, then the DC bus voltage signal may decrease very sharply, which results in a large difference between the first and second voltages signals V1,V2. Thus, if the difference between the first and second voltage signals V1,V2 exceeds a first predetermined threshold value the control block 28 increments an error counter 29, as shown in step 206. If the difference between the first and second voltage signals V1,V2 does not exceed the first predetermined threshold value, then the control block 28 compares the actual first voltage signal V1 to the recorded stabilized first voltage signal V3, as shown in step 208. If the difference between the actual first voltage signal V1 and the recorded stabilized first voltage signal V3 exceeds a second predetermined threshold value the control block 28 increments the error counter, as shown in step 206. The control block 28 determines whether the error count exceeds a predetermined threshold number of errors, as shown in step 210, and if so, determines that the inrush relay 24 may be operating improperly (though some other problem may be to blame for the changing DC bus voltage) and sends a control signal to open the inrush relay 24 and restart the motor 12, as shown in step 212. Restarting the motor 12 both cycles the signal to the inrush relay 24, which may be sufficient to unstick a stuck contact, and allows the motor control subsystem 16 to observe the DC bus voltage signal under starting conditions, which may be sufficient to determine whether the inrush relay 24 or some other problem is to blame for the behavior of the DC bus voltage signal. More specifically, the behavior of the DC bus voltage signal during starting is more informative because voltage fluctuations are more pronounced and quicker and less likely to be due to lightning strikes or other line transients and anomalies. The control block 28 is thus better able to determine whether the inrush relay 24 is to blame, as shown in step 214, and if so, shut off and, possibly, restart the motor 12, as shown in step 216. Thus, in the second embodiment, when a potential fault is detected as extended abnormal behavior by the bus voltage signal, the control block 28 may cause the motor 12 to be restarted in order to observe the bus voltage signal's more distinctive behavior under starting conditions in order to confirm that the behavior is caused by the inrush relay 24.

Requiring that that the error counter 27 exceed the predetermined threshold number of errors before determining that the inrush relay 24 may not be operating properly allows for being more specific in defining what constitutes a fault condition (i.e., the amount by which the DC bus voltage signal decreases) and, therefore, for detecting fault conditions at lower operating conditions. Small fluctuations that can occur during normal operation may increment the error counter 27 a relatively low number of times (e.g., <100 times), but a failure of the inrush relay 24 may increment the error counter 27 a relatively high number of times (e.g., >500) even at relatively low operating points (e.g., an input current of <0.25 A).

Any or all of these predetermined values, including the predetermined threshold value and the predetermined threshold number of errors may be stored in one or more memories, such as electrically erasable read-only memories, that are accessible to the control block 28.

Thus, the present invention provides advantages over the prior art, including that it provides improved inrush current protection by detecting whether the inrush relay 24 properly closes shortly after power is applied to the system 10 (and remains closed during subsequent operation), and if not, responds by restarting the motor 12 to confirm a problem with the inrush relay 24 and then shutting off the motor 12 to avoid damage to the inrush resistor 22.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An electric motor system comprising:
   an electric motor; and
   a motor control subsystem operable to control operation of the electric motor, the motor control subsystem including—
     a power inverter operable to receive power from a power source and to convert the power to drive the electric motor,
     an inrush resistor electrically connected in series with the power source and operable to ameliorate an initial increase in an electric current during charging of a bus capacitor prior to starting the electric motor,
     an inrush relay electrically connected in parallel with the inrush resistor and operable to close after the bus capacitor is charged and thereby direct the electric current around rather than through the inrush resistor,
     a differential amplifier electrically connected across the inrush resistor and operable to sense a differential voltage across the inrush resistor and to produce an output voltage signal that is proportional to the differential voltage, and
     a control circuit in communication with the differential amplifier and operable to determine whether the inrush relay is open based on the output voltage signal of the differential amplifier, and if the inrush relay is open and the motor is running, to take remedial action to protect the inrush resistor.

2. The electric motor system as set forth in claim 1, wherein the electric motor is an electric induction or permanent magnet motor.

3. The electric motor system as set forth in claim 1, wherein the remedial action includes sending a control signal to shut off the electric motor.

4. The electric motor system as set forth in claim 1, wherein the remedial action includes sending a first control signal to open the inrush relay and restart the electric motor, determining whether the inrush relay is operating properly during the restarting of the electric motor, and if the inrush relay is not operating properly, sending a second control signal to the power inverter to shut off the electric motor.

5. A method of controlling an electric motor system including an electric motor, the method comprising the steps of:
   (1) receiving power from a power source and converting the power with a power converter to drive the electric motor;
   (2) ameliorating an initial increase in an electric current during charging of a bus capacitor prior to starting the electric motor using an inrush resistor electrically connected in series with the power source;
   (3) directing the electric current around the inrush resistor after the bus capacitor is charged by closing with a control circuit an inrush relay electrically connected in parallel with the inrush resistor;
   (4) sensing with a differential amplifier a differential voltage across the inrush resistor and producing an output voltage signal that is proportional to the differential voltage;
   (5) determining with the control circuit whether the inrush relay is open based on the output voltage signal; and
   (6) if the inrush relay is open and the motor is running, taking remedial action with the control circuit to protect the inrush resistor including shutting off the electric motor, opening the inrush relay and restarting the electric motor, determining whether the inrush relay is operating properly during the restarting of the electric motor, and if the inrush relay is not operating properly, shutting off the electric motor again.

6. The method as set forth in claim 5, wherein the electric motor is an electric induction or permanent magnet motor.

7. An electric motor system comprising:
   an electric motor; and
   a motor control subsystem operable to control operation of the electric motor, the motor control subsystem including—
     a power inverter operable to receive power from a power source and to convert the power to drive the electric motor,
     an inrush resistor electrically connected in series with the power source and operable to ameliorate an initial increase in an electric current during charging of a bus capacitor prior to starting the electric motor,
     an inrush relay electrically connected in parallel with the inrush resistor and operable to close after the bus capacitor is charged and thereby direct the electric current around rather than through the inrush resistor, a slow response filter connected to a bus voltage and operable to produce an output voltage signal that is a delayed version of the bus voltage, and a control circuit in communication with the slow response filter and operable to determine a voltage difference between the bus voltage and the output voltage signal of the slow response filter, wherein the voltage difference is representative of a change in the bus voltage, and if the voltage difference exceeds a predetermined threshold value and the motor is running, to take remedial action to protect the inrush resistor.

8. The electric motor system as set forth in claim 7, wherein the electric motor is an electric induction or permanent magnet motor.

9. The electric motor system as set forth in claim 7, wherein the remedial action includes sending a control signal to shut off the electric motor.

10. The electric motor system as set forth in claim 7, wherein the remedial action includes sending a first control signal to open the inrush relay and restart the electric motor, determining whether the inrush relay is operating properly during the restarting of the electric motor, and if the inrush relay is not operating properly, sending a second control signal to the power inverter to shut off the electric motor.

11. The electric motor system as set forth in claim 7, wherein the remedial action performed by the control block control circuit includes— incrementing an error count stored on an error counter;

if the error count exceeds a predetermined threshold number of errors, sending a first control signal to open the inrush relay and restarting the electric motor;

determining whether the inrush relay is closing properly after the electric motor is restarted; and if the inrush relay is not closing properly, sending a second control signal to shut off the electric motor.

12. The electric motor system as set forth in claim 7, wherein the control circuit is further operable to— monitor the bus voltage during and after starting of the electric motor;

determine when the bus voltage stabilizes;

record the stabilized bus voltage;

compare the recorded stabilized bus voltage to the actual bus voltage; and increment the error counter if a difference between the recorded stabilized bus voltage and the actual bus voltage exceeds a second predetermined threshold value.

13. A method of controlling an electric motor system including an electric motor, the method comprising the steps of:

(1) receiving power from a power source and converting the power with a power converter to drive the electric motor;

(2) ameliorating an initial increase in an electric current during charging of a bus capacitor prior to starting the electric motor using an inrush resistor electrically connected in series with the power source;

(3) directing the electric current around the inrush resistor after the bus capacitor is charged by closing with a control circuit an inrush relay electrically connected in parallel with the inrush resistor;

(4) receiving with a slow response filter a bus voltage and generating an output voltage signal that is a delayed version of the bus voltage;

(5) determining with the control circuit a voltage difference between the bus voltage and the output voltage signal, wherein the voltage difference is representative of a change in the bus voltage; and (6) if the voltage difference exceeds a determined threshold value and the motor is running, taking remedial action with the control circuit to protect the inrush resistor including shutting off the electric motor, opening the inrush relay and restarting the electric motor, determining whether the inrush relay is operating properly during the restarting of the electric motor, and if the inrush relay is not operating properly, shutting off the electric motor again.

14. The method as set forth in claim 13, wherein the electric motor is an electric induction or permanent magnet motor.

15. The method as set forth in claim 13, wherein the remedial action performed by the control circuit includes— incrementing an error count stored on an error counter;

if the error count exceeds a predetermined threshold number of errors, opening the inrush relay and restarting the electric motor;

determining whether the inrush relay is closing properly after the electric motor is restarted; and if the inrush relay is not closing properly, shutting off the electric motor again.

16. The method as set forth in claim 13, further including with the control circuit— monitoring the bus voltage during and after starting of the electric motor;

determining when the bus voltage stabilizes;

recording the stabilized bus voltage; and using the stabilized bus voltage as the bus voltage in steps (4) and (5).

* * * * *